United States Patent
Cheriton

(10) Patent No.: US 8,064,451 B2
(45) Date of Patent: *Nov. 22, 2011

(54) NETWORK ADDRESS TRANSLATION FOR MULTICAST VIRTUAL SOURCING

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 10/991,848

(22) Filed: Nov. 18, 2004

(65) Prior Publication Data

US 2005/0089050 A1  Apr. 28, 2005

Related U.S. Application Data

(63) Continuation of application No. 09/566,902, filed on May 10, 2000, now Pat. No. 6,831,917.

(51) Int. Cl.
 H04L 12/56 (2006.01)

(52) U.S. Cl. .................................. 370/392; 370/401

(58) Field of Classification Search .................. None
See application file for complete search history.

(56) References Cited

U.S. PATENT DOCUMENTS

| | | | |
|---|---|---|---|
| 4,814,883 A |   | 3/1989 | Perine et al. ............ 358/181 |
| 5,138,440 A |   | 8/1992 | Radice ................... 370/474 |
| 5,166,931 A | * | 11/1992 | Riddle .................. 370/401 |
| 5,287,103 A | * | 2/1994 | Kasprzyk et al. ...... 340/825.52 |
| 5,428,615 A | * | 6/1995 | Backes et al. ........... 370/392 |
| 5,517,494 A |   | 5/1996 | Green .................... 370/60 |
| 5,561,670 A |   | 10/1996 | Hoffert et al. .......... 370/94.1 |
| 5,577,035 A | * | 11/1996 | Hayter et al. ........... 370/395.4 |
| 5,651,002 A | * | 7/1997 | Van Seters et al. ...... 370/392 |
| 5,740,171 A |   | 4/1998 | Mazzola et al. .......... 370/392 |
| 5,793,763 A |   | 8/1998 | Mayes et al. ............ 370/389 |
| 5,856,974 A | * | 1/1999 | Gervais et al. .......... 370/392 |
| 5,894,480 A |   | 4/1999 | Hoffert et al. .......... 370/389 |
| 5,917,819 A | * | 6/1999 | Yang et al. ............. 370/390 |
| 5,956,335 A | * | 9/1999 | Backes et al. ........... 370/392 |
| 5,963,557 A | * | 10/1999 | Eng .................... 370/432 |
| 6,000,053 A |   | 12/1999 | Levine et al. ........... 370/470 |

(Continued)

OTHER PUBLICATIONS

"*The IP Network Address Translator (NAT)*," Internet Engineering Task Force (IETF) Request for Comment (RFC) 1631; K. Egevang,, P. Francis; May 1994.

(Continued)

*Primary Examiner* — Salman Ahmed
*Assistant Examiner* — Timothy J Weidner
(74) *Attorney, Agent, or Firm* — Campbell Stephenson LLP

(57) ABSTRACT

A method for using network address translation in switches and routers to define a virtual host as the source of a multicast channel within a single-source multicast model and to translate packet addresses from different multicast sources so that the packets appear to be originating from the virtual host. Address-translated packets are thus forwarded through a single-source multicast channel and received by the subscribing host(s)/clients as though the packets came from a single "virtual" source. This methodology can be used to map two or more sources simultaneously onto the same multicast channel. Such a mapping is useful, for example, to present multiple views of a sporting event video broadcast, provide advertisement insertion capability, or to support transparent failover to a backup video source in a critical multicast application. Subscribing client hosts in the multicast reception group simply subscribe to the single virtual host as the source of a multicast channel.

30 Claims, 7 Drawing Sheets

U.S. PATENT DOCUMENTS

| | | | | |
|---|---|---|---|---|
| 6,006,272 | A | 12/1999 | Aravamudan et al. | 709/245 |
| 6,119,171 | A | 9/2000 | Alkhatib | 370/409 |
| 6,175,867 | B1 * | 1/2001 | Taghadoss | 709/223 |
| 6,181,697 | B1 * | 1/2001 | Nurenberg et al. | 370/390 |
| 6,272,127 | B1 | 8/2001 | Golden et al. | 370/352 |
| 6,295,295 | B1 * | 9/2001 | Wicklund | 370/392 |
| 6,542,503 | B1 * | 4/2003 | Xu et al. | 370/390 |
| 6,597,700 | B2 | 7/2003 | Golikeri et al. | 370/401 |
| 6,611,872 | B1 * | 8/2003 | McCanne | 370/390 |
| 6,718,387 | B1 * | 4/2004 | Gupta et al. | 709/226 |
| 6,754,211 | B1 * | 6/2004 | Brown | 370/389 |
| 6,771,644 | B1 * | 8/2004 | Brassil et al. | 370/390 |
| 6,831,917 | B1 * | 12/2004 | Cheriton | 370/392 |
| 7,379,425 | B2 * | 5/2008 | Okamoto | 370/237 |
| 7,542,462 | B1 * | 6/2009 | Murphy | 370/352 |

OTHER PUBLICATIONS

"*IP Multicast Channels: EXPRESS Support for Large-Scale Single-Source Applications*"; Hugh W. Holbrook and David R. Cheriton; SigComm 1999.

"*Internet Multicast Today*"; Internet Protocol Journal, vol. 2, No. 4; Mark Handley; Dec. 1999.

Karanjit S. Siyan, Ph.D., *Inside TCP/IP*, Third Edition, New Riders Publishing, 1997, Chapter 9, pp. 426-429.

Ranch, David A., "Guru Guidance—Setting Up IP Masquerade," Aug. 1999, Linux Magazine.

* cited by examiner

NETWORK ADDRESS TRANSLATION FOR MULTICAST VIRTUAL SOURCING

CROSS-REFERENCE TO RELATED APPLICATIONS

This application is a continuation of U.S. patent application Ser. No. 09/566,902, entitled "Network Address Translation For Multicast Virtual Sourcing", filed May 10, 2000, now U.S. Pat. No. 6,831,917 and naming David R. Cheriton as the inventor. This application is assigned to CISCO TECHNOLOGY, INC., the assignee of the present invention, and is hereby incorporated by reference, in its entirety and for all purposes.

BACKGROUND OF THE INVENTION

1. Field of the Invention

The present invention relates to internetworking and in particular to packet multicasting.

2. Description of the Related Art

Conventional Internet Protocol (IP) multicast provides a multi-source group model in which receivers in a multicast group G receive packets from any source S on the Internet. Conventional IP multicasting is further described in Karanjit S. Siyan, *Inside TCP/IP*, 3d ed., New Writers Publishing, 1997, pages 426-429. IP multicasting is also described in U.S. Pat. No. 5,517,494 to Green entitled "Method and System of Multicast Routing for Groups with a Single Transmitter" and M. Handley, "Internet Multicast Today," *The Internet Protocol Journal*, December 1999, p. 2. All of these references are incorporated herein by reference in their entireties.

Recent work has recognized that major benefits in addressing, access control, and routing scalability are to be found from restricting multicast to a single-source multicast model. For example see, Hugh W. Holbrook and David R. Cheriton, "IP Multicast Channels: EXPRESS Support for Large Scale Single-source Applications" 'presented at SIGCOMM 1999, incorporated herein and by reference in its entirety. Most current applications for multicast are transmitted from a single-source or largely from a single-source out of a small group of sources. For example, video broadcasts, corporate file distribution, and stock quote distribution and dissemination applications are a few well-known, single-source applications. All essentially provide source data from one transmitting host.

One problem seen in the art is encountered when supporting multicast applications that are largely, but not entirely, single-source. Current state of the art approaches typically delegate the multicasting operation entirely to (slower) application level proxies, such as those provided by Akamai or FastForward. Other alternatives known in the art rely on complicated network and receiving host protocols. Such systems are described in U.S. Pat. Nos. 5,894,480 and 5,561,670, both to Hoffert et al. And both entitled "Method and Apparatus for Operating a Multicast System on an Unreliable Network." These patents describe variations on the well-known Internet Group Management Protocol (IGMP) and are incorporated by reference herein in their entireties.

All of these prior art methods share a common failing in that each is necessarily slowed by the overhead of the messaging protocols and OSI upper-layer application processing. This slow down also increases cost by constraining transmission speed, adding processing complexity, and increasing the probability of error.

What is needed is a simple, scaleable method of providing single-source multicasting from a small plurality of sources that appears to receiver groups as if it were originating from a unique, single-source host.

SUMMARY

The present invention is a method for using network address translation (NAT) in switches and routers to define a virtual host as the source of a multicast channel within a single-source multicast model. This method translates packets from different (actual) multicast sources to the virtual host as part of the conventional packet forwarding process. Address-translated packets are thus forwarded through a single-source multicast channel and received by the subscribing host(s) as though the packets came from a single "virtual" source.

This methodology can be used to map two or more sources simultaneously onto the same multicast channel. Such a mapping is useful, for example, to present multiple views of a sporting event video broadcast, provide advertisement insertion capability, or to support transparent fail-over to a backup video source in a critical multicast application.

Listening or receiving hosts in the multicast reception group simply subscribe to the single virtual host as the source of a multicast channel. It is not necessary for the recipient hosts to know the actual origin of the multicast data stream or its constituent parts; all that is required is that the recipient hosts subscribe to the proper multicast group channel and the virtual host address. The receiving group hosts are thus oblivious to the physical source of the multicast content. This application is analogous to a web site in which a single virtual host is actually implemented by multiple physical hosts, except the virtual host for the client machines in the web site case is the destination address to which they send, rather than the source address from which members of the multicast group receive.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

As a representative use of the present invention, consider the following situation: an Internet television station with a point of presence at an Internet Service Provider (ISP) headend allocates a virtual host address S and multicast address G for an Internet television channel. This address is identified as (S,G), denoting source S and subscriber recipient group G. Hosts that wish to receive this particular Internet television feed then subscribe to the multicast channel (S,G) in the conventional manner normally used in single-source multicast applications.

Figure 1:
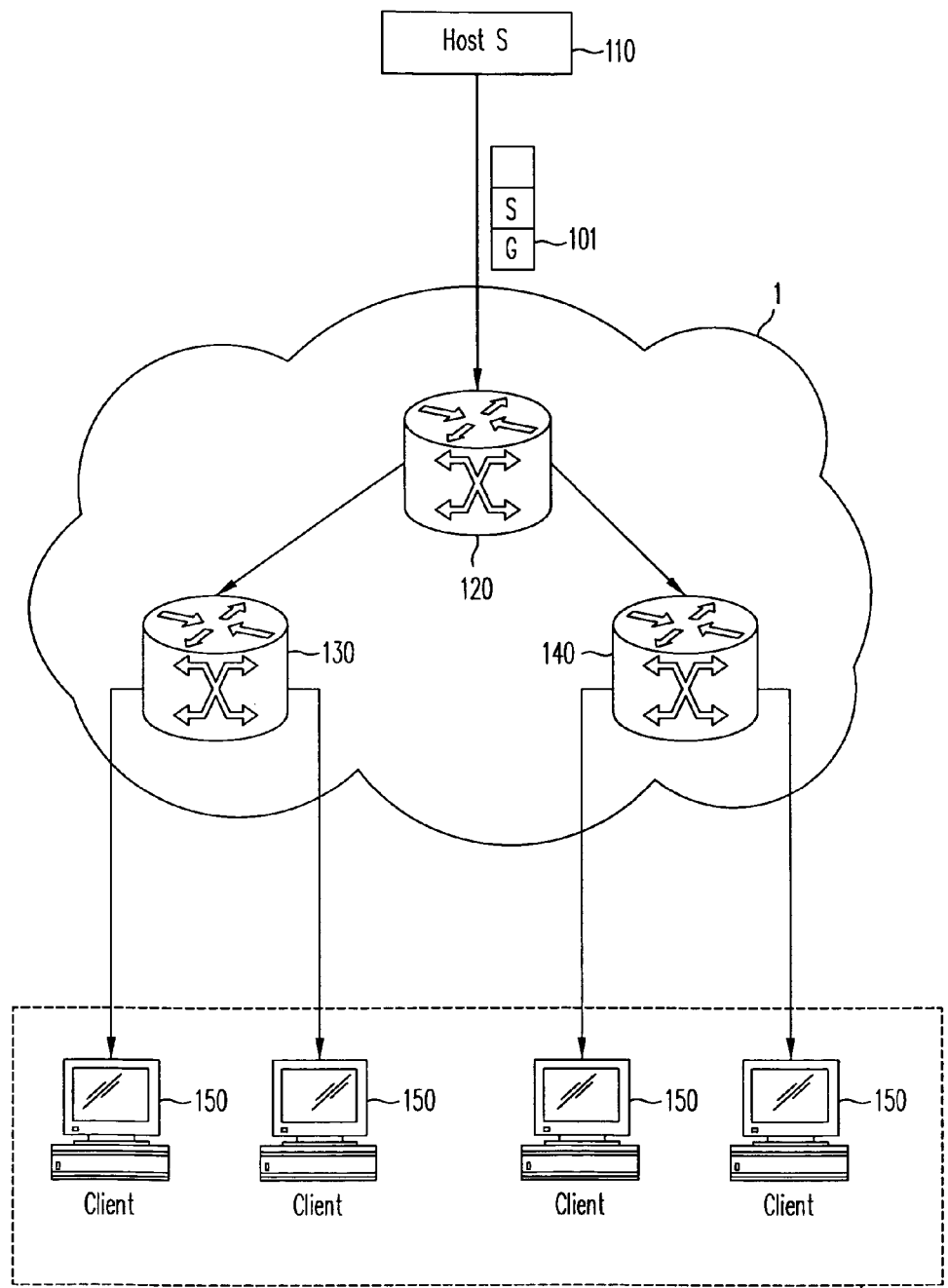
FIG. 1 is a high level schematic of a prior art multicast system.

In prior art multicast systems, shown schematically in FIG. 1, packets multicast from source host 110 (a.k.a. source S) to group 115 (a.k.a. group G) are replicated by one or more routers 120, 130, and 140, all a representative part of the well-known Internet 1, and delivered to each subscribing client host 150. Each subscriber 150 within group 115 is said to be subscribing to the single-source multicast channel identified by (S,G).

Network address translation (NAT) is also known in the art. See, e.g., U.S. Pat. No. 5,793,763 to Mayes et al., "Security System for Network Address Translation Systems"; U.S. Pat. No. 5,740,171 to Mazzola et al., "Address Translation Mechanism for a High-Performance Network Switch"; and U.S. Pat. No. 6,006,272 to Aravamudan et al., "Method for Network Address Translation," incorporated herein by reference in their entireties.

Figure 2:
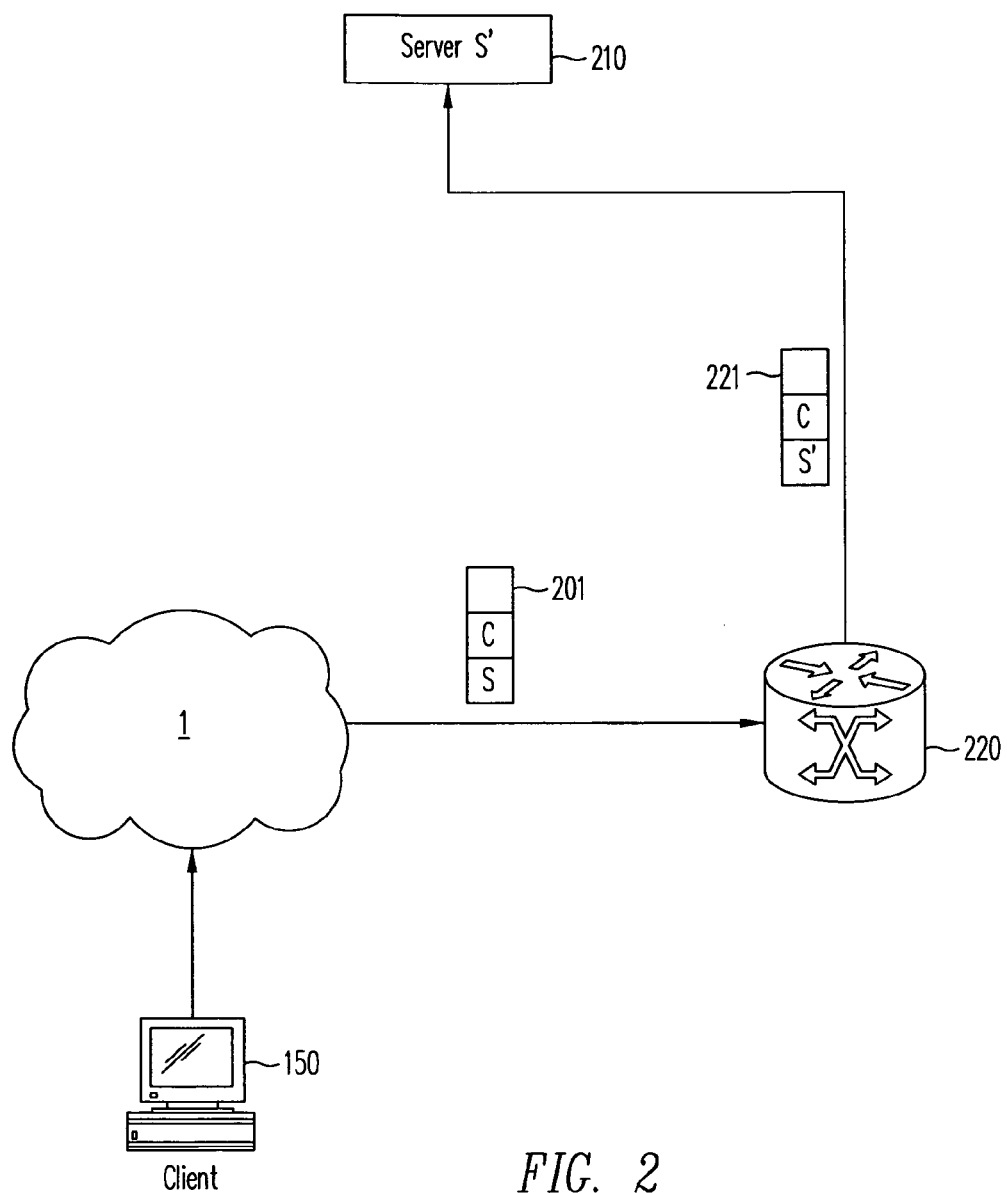
FIG. 2 is a high level schematic of a prior art Network Address Translation (NAT) system showing an implementation of destination address translation.

One prior art method of performing NAT is shown schematically in FIG. 2. Client host 150 sends packets 201 over Internet 1. These packets are addressed with source address (SA) C and destination address (DA) S, where S is the address of a unicast virtual host. NAT router 220 translates the virtual host DA S to S' (which is the unicast address of [real] server 210) and forwards the modified packet 221 to server 210.

Figure 3:
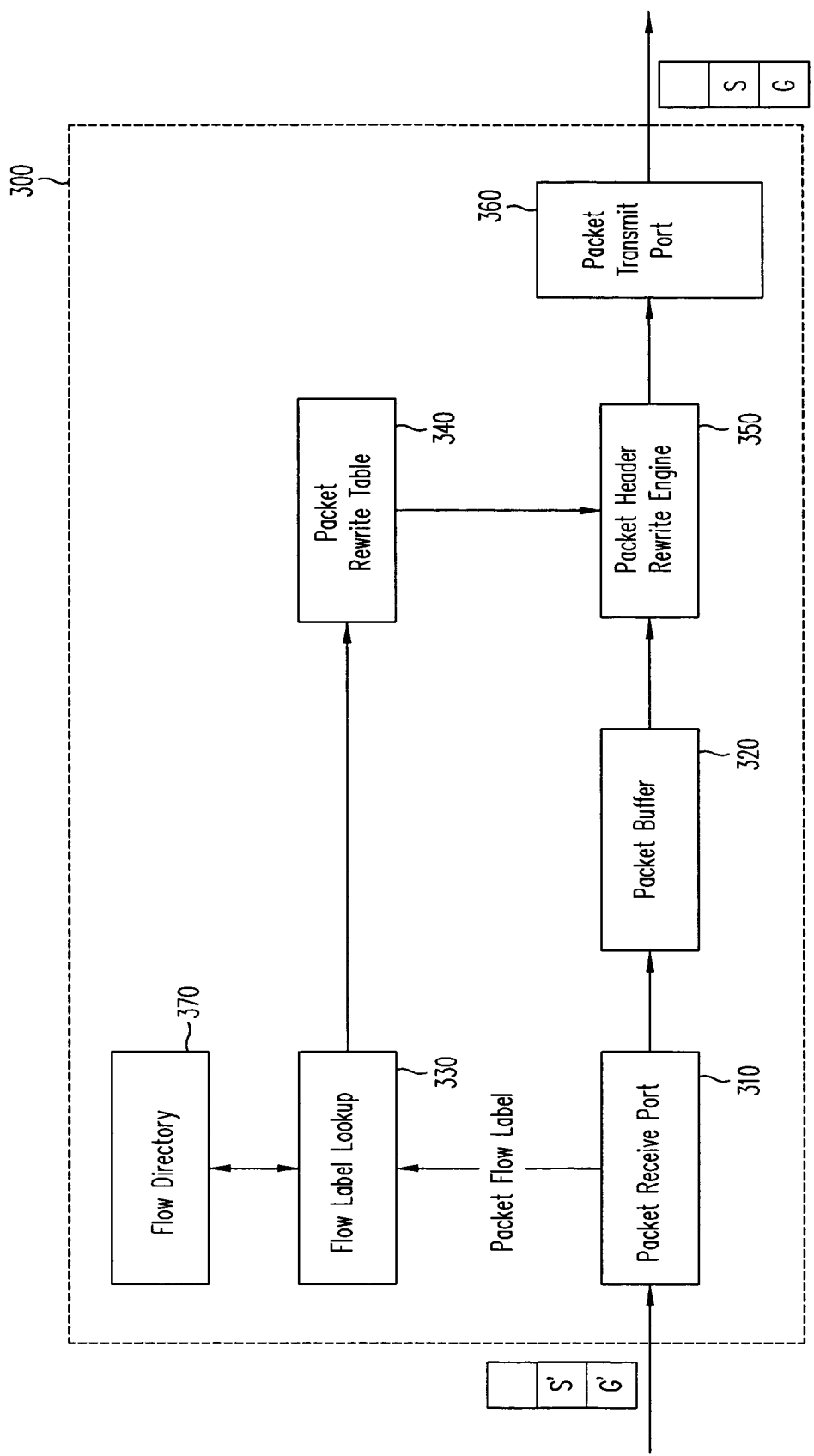
FIG. 3 is a high level schematic of a NAT-capable switch/router, according to one embodiment of the present invention.

FIG. 3 illustrates a NAT-capable switch 300 according to one embodiment of the present invention. Packets addressed to (S',G') are received from the Internet (not shown) at packet receive port 310. The packet flow label, which conventionally includes all or part of the packet header as commonly known in the art, is passed the flow label lookup module 330. Packets are then stored in packet buffer 320, pending transmission scheduling.

Flow label lookup module 330 maintains a flow directory 370 to map each flow label to an index that points to an entry in rewrite table 340. Packet rewrite table 340 stores rewrite information for packets matching some or all flow table entries which are programmed to redirect packets to multicast group G as if they had come from a virtual host source S. This rewrite information is used by packet header rewrite engine 350 to rewrite the SA and DA in the packet header prior to transmission out of NAT-capable switch 300 through transmit port 360.

Packet receive port 310, packet buffer 320, and packet transmit port 360 are conventional modules commonly used in data communications switches and routers. These modules, well-known in the art, typically consist of circuits (hardware) and/or software configured to provided the required functionality. Flow label lookup 330 and corresponding flow directory 370 are conventionally implemented using standard lookup algorithms and/or hardware (such as a content addressable memory [CAM] or random access memory [RAM]). Packet rewrite table 340 is implemented, in some embodiments of the present invention, in a conventional RAM.

Packet rewrite engine 350 is implemented, in one embodiment of the present invention, as part of the conventional packet routing mechanism whereby the destination address (at a minimum) for the next network hop is written into the packet header.

Figure 4:
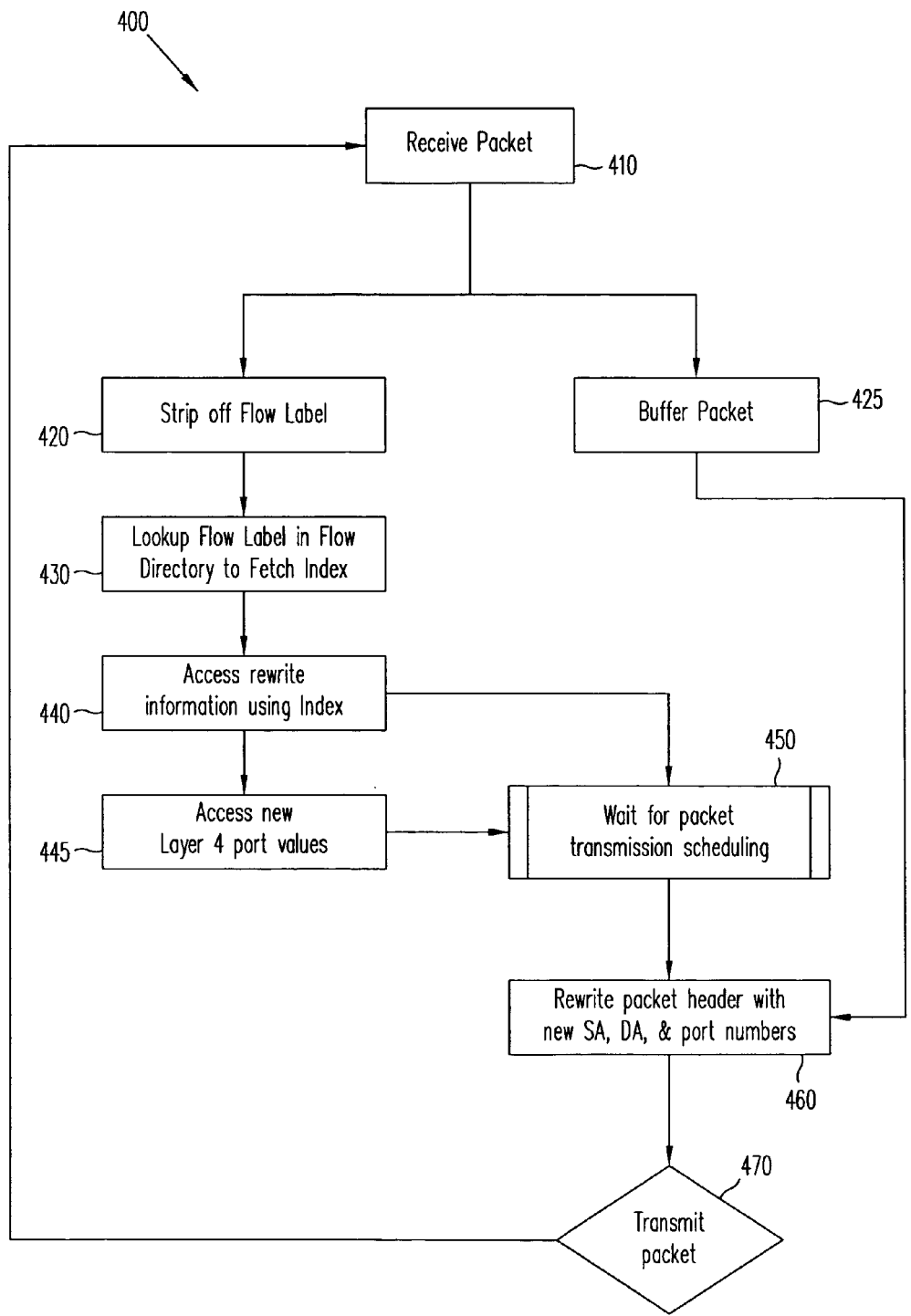
FIG. 4 is a flowchart of the virtual host NAT process, according to one embodiment of the present invention.

The virtual host NAT process 400 is depicted in the flowchart of FIG. 4, according to one embodiment of the present invention. Process 400, which operates in a continuous loop, logically begins at step 410 with the receipt of an incoming packet. The flow label (including but not limited to some or all of the packet header, as known and understood in the art) is stripped off 420 and the packet is stored (buffered) temporarily, step 425. At this point, the packet SA is defined as S' and the DA is defined as G', which represents the actual source of the packet (S') and the address of the NAT switch/router (G'). G' may also represent a multicast address to which the NAT switch/router is listening or even a separate address that the NAT switch/router has been programmed to intercept.

In step 430, a lookup is performed using the flow label, returning an index to the rewrite information corresponding to the specific flow label. Rewrite information is read in step 440, using the index. This rewrite information indicates that the SA of the incoming packet should be changed to S (the virtual host) and the DA to G (the destination multicast group). Optionally (in some embodiments of the present invention), new values for the OSI layer 4 port numbers are also extracted from the rewrite table in step 445.

Step 450 is an optional wait state during which the process waits for the packet to be scheduled for outbound transmission. This step may be omitted in implementations where a scheduling delay or wait period is not present or required.

The packet is rewritten in step 460 to include the new SA S and the new DA G, as determined previously. Step 470 transmits the packet to multicast group G.

Returning to the television example noted above, the Internet television station has typically contracted for a network television feed, for example CBS or NBC. This system is depicted (at a high level) in FIG. 5. The Internet television station receives the network feed from a particular source host 510 (host S1) with a multicast address G'. The headend NAT router 520 at the ISP 525 used by the Internet television station is therefore configured to subscribe to (S',G') and to translate the IP source and destination addresses (SA and DA) of packets coming from source (S',G') to (S,G). In some embodiments, the NAT router 520 may also translate the UDP/TCP (OSI layer 4) port numbers and other high-level information in the packet during conventional routing. In another embodiment, the NAT router 520 may even translate between different data encodings, again using conventional techniques, in addition to performing virtual host translation.

Subscribers 550 join the single-source multicast group (S,G) by listening to NAT router 520, which has an IP address of S. As discussed above, NAT router 520 provides the address translation from source host 510 and routes packets over Internet 1 using routers 541, 542, and 543 (for example). One of ordinary skill in the art will appreciate that Internet 1 actually comprises an enormous number of routers; the routers here depicted are for ease of illustration rather than limitation.

In this configuration, the network address translation from (S',G') to (S,G) provides transparent source remapping to the virtual host (S,G) for all subscribers in subscribing group 535.

As is well known in the television broadcast industry, local insertion of station breaks or local advertising is commonly performed on network feeds. See, e.g., U.S. Pat. No. 4,814,883 to Perine et al., "Multiple Input/Output Video Switch for Commercial Insertion System," incorporated herein by reference in its entirety. In such a situation, a local television station receiving a network feed, inserts (using conventional automated equipment) its own advertising, station identification, and/or promotional materials in designated time slots within the video feed data stream.

The virtual hosting NAT method of the present invention enables an analogous local insertion capability for single-source multicast feeds. To insert a local station break or advertising from a second source 515 (host S2) designated (S",G"), the NAT router 520 forwarding state is changed (based on system time or an explicit time signal) to translate and forward packet addressed to (S",G") as if they were addressed to a virtual host (S,G).

In one embodiment, the time signal designates the beginning of the insert time slot. At the end of the designated time slot, the headend router 520 address translation mapping is changed back to the original video source 510 (S',G'). The video source may also be temporarily or permanently set to a third video source (not shown) to provide additional source options.

The change in network address translation mapping discussed above is performed in small numbers of milliseconds or less, which enables switching between the video frames of a video multicast stream. Thus, a seamless transition (as seen by subscribing hosts 550 in multicast group 535) between one program source 510 and another (e.g., source host 515) is provided by the present technique. In fact, subscribers 550 to such a single-source, virtual host multicast would likely be unable to detect a source transition because all of the traffic will appear to the subscribers as originating from a single virtual host (S,G).

In an alternate embodiment of the present invention, this same mechanism can be used to map two or more sources simultaneously onto the same multicast channel. Such multiple sources could be used for a variety of purposes, including (but not limited to) multiple views of sporting or performance events or transparent fail-over to a backup multicast source. FIG. 6 depicts an example of a time-multiplexed source system. As in FIG. 5, all packets are forwarded over the multicast channel 610, except that in the multiplex embodiment of FIG. 6 all sources are present in the channel, each in a separate time interval or division.

Sources 601, 602, and 603 (which may be TV cameras or video sources, for example) each supply packet streams to NAT router 620. Each packet stream is separately addressed $(S_x,G_x)$, where x=the source number, e.g., x=1 for camera 1 (601), 2 for camera 2 (602), and so on.

Although a camera source is described, those skilled in the art will realize that packet sources other than a camera, such as a video tape player or digital video disk (DVD) can be used. Accordingly, the invention is not limited to any particular type of source.

The source packets $(S_x,G_x)$ are combined and multiplexed in NAT router 620, entering multicast channel 610 as time tagged packets identified by the tuple (n,S,G), where n=the time slot identifier and S and G are the virtual host source S and destination multicast group G addresses. The time slot identifier is, in one embodiment of the present invention, an ordinal corresponding to x above. In the present example, where there are three sources, n takes only the values 1, 2, or 3.

Figure 5:
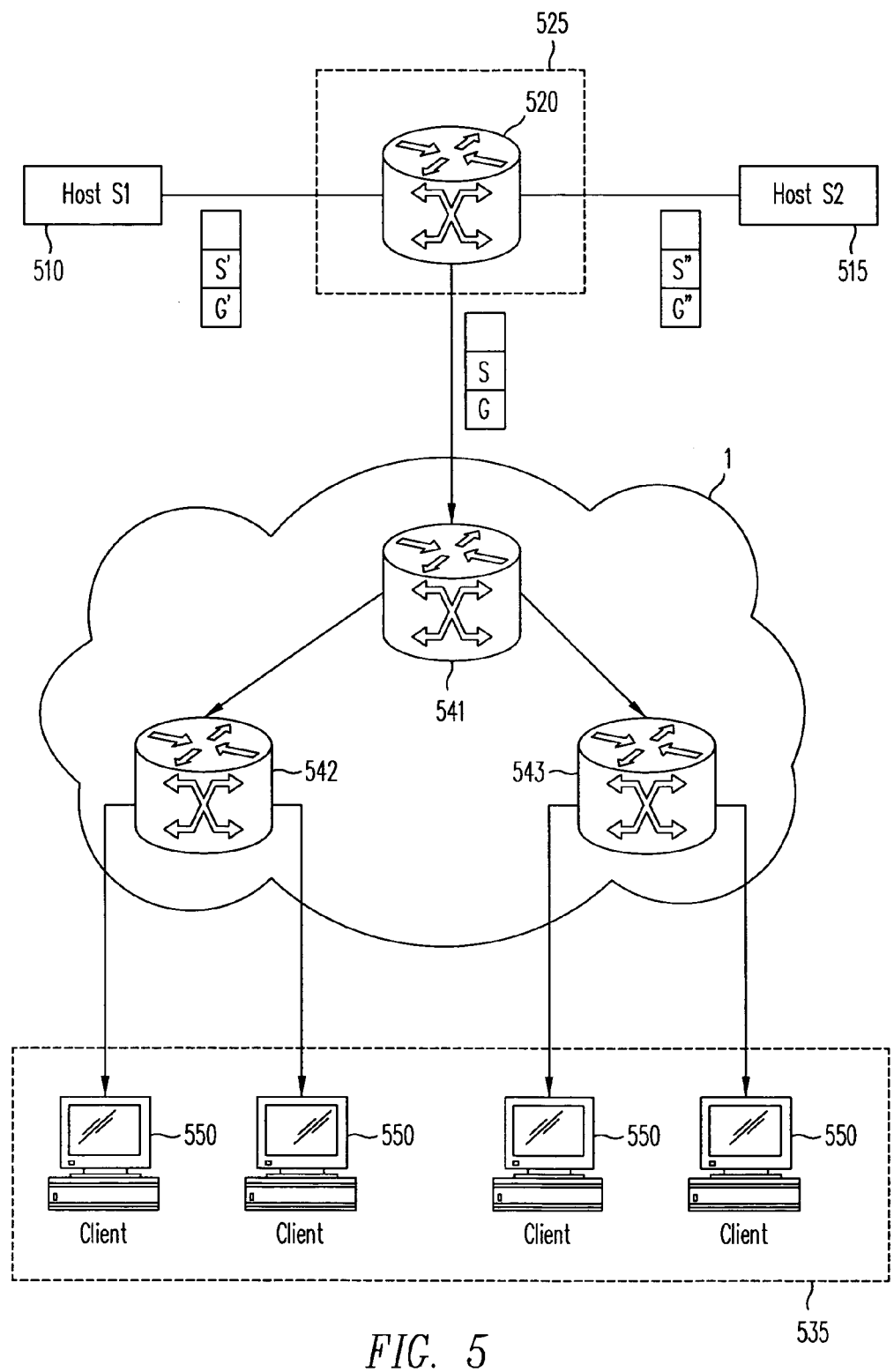
FIG. 5 is a high level schematic of an Internet television station using one embodiment of the present invention.
Figure 6:
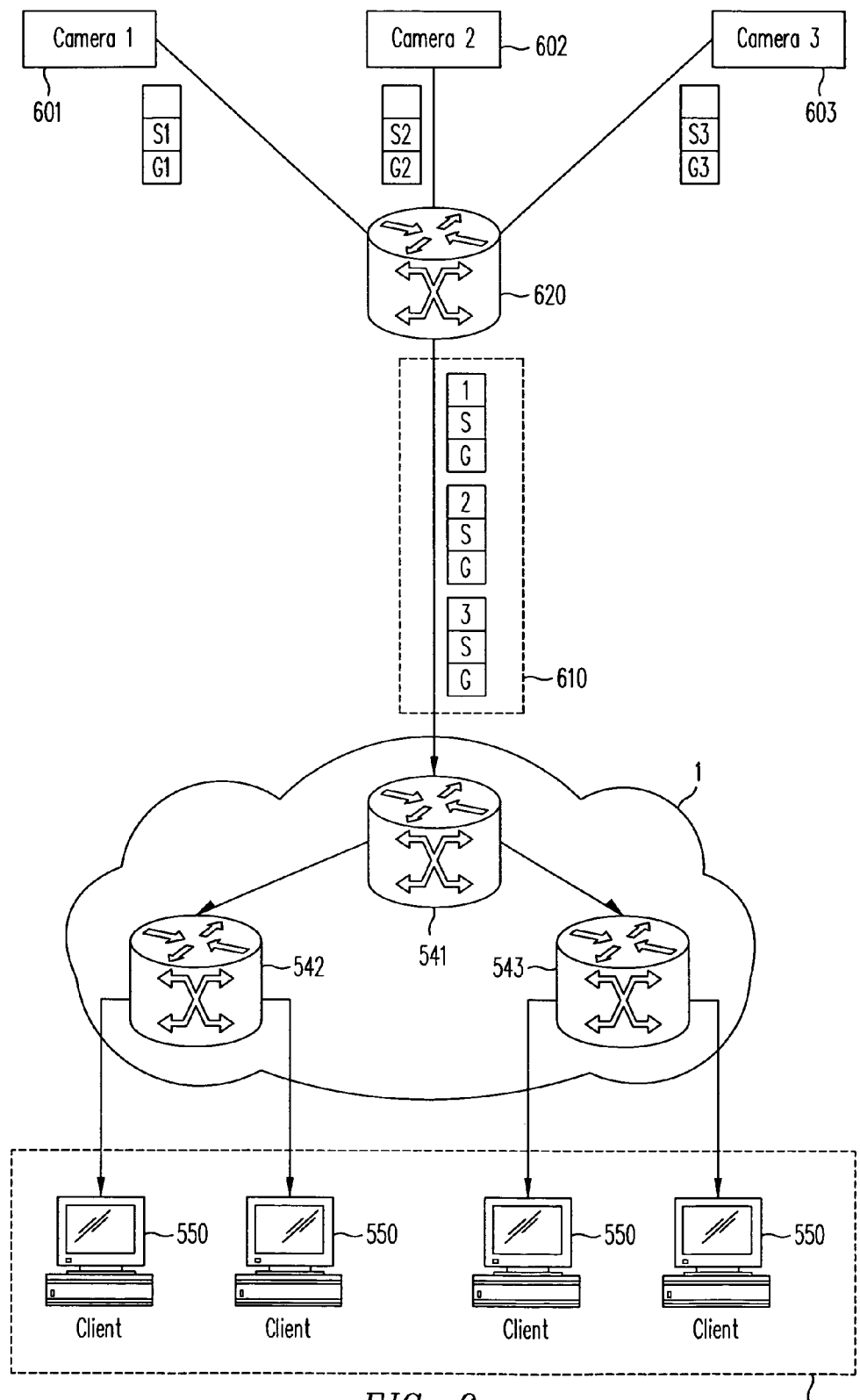
FIG. 6 is a high level schematic of source multiplexing using one embodiment of the present invention.

As in FIG. 5, multicast channel 610 is forwarded through Internet 1 and the routers and switches therein to subscribing clients 550 in multicast group 535. Two or more sources 601-603 can thus be combined over a common wide area multicast distribution channel 610. The multiplexed channel is then pulled apart (demultiplexed) on reception at the first edge routers connected to the Internet in the subscribing group of hosts (clients) 550. Such multiplexing might be motivated by the cost of a particular wide area multicast channel, allowing a cost saving to be realized through source multiplexing.

The multiple views from multiple sources and dynamic virtual host re-mapping capability disclosed here can also be used to provide additional levels of service, and thus subscriber value, to multicast transmissions. For example, dynamic virtual source remapping can be used to send the same multicast stream over multiple multicast channels to multiple destination groups. Time-based skewing either to time-shift receipt of the program at the subscribing hosts or to compensate for route transit time differences may also be provided. The former is useful for transmissions to multiple groups requiring reception of the same data but at different times. For example, a video playback starting 15 minutes later than an earlier multicast of the same video stream is also provided by one embodiment of the present invention.

Figure 7:
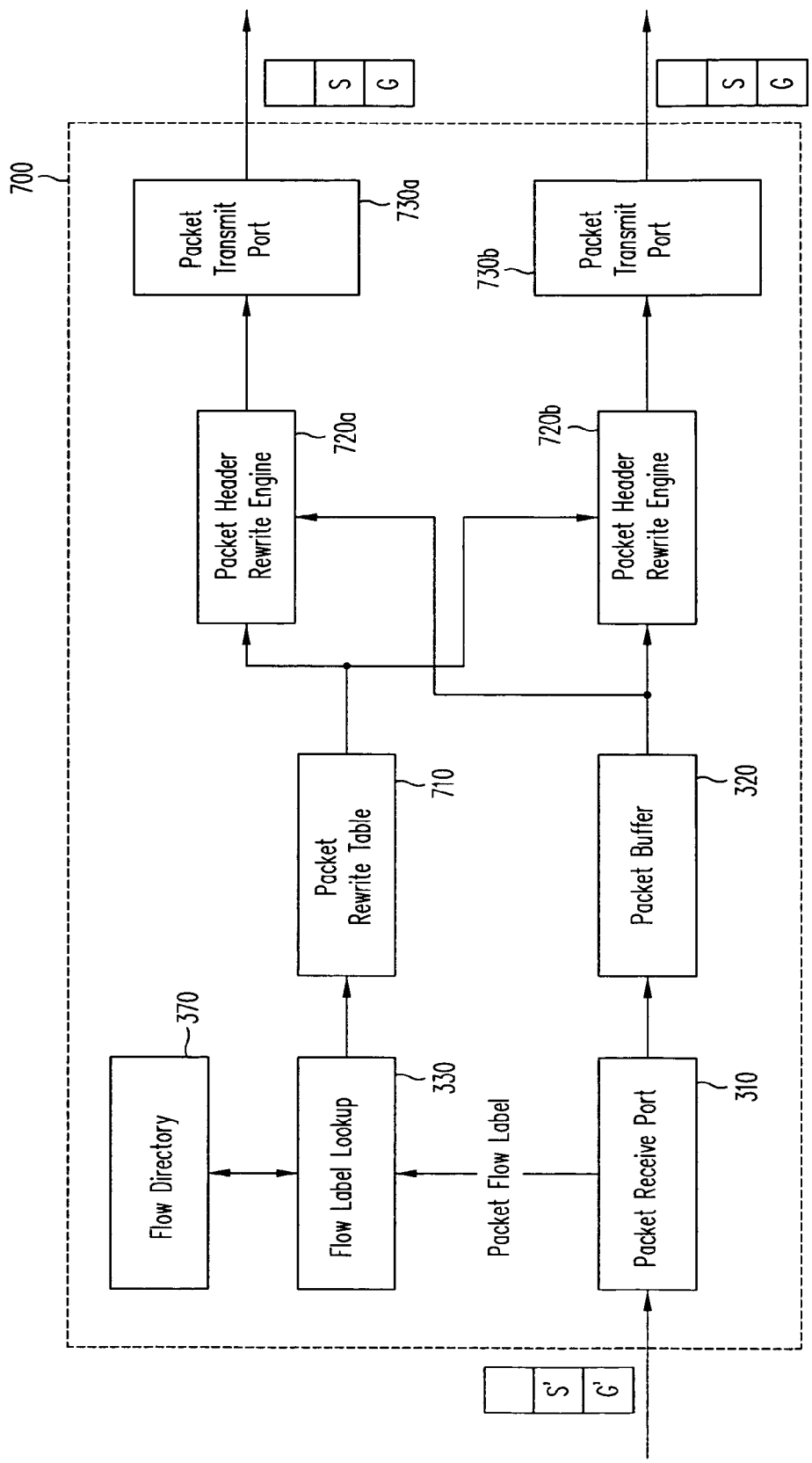
FIG. 7 is a high level schematic of NAT-capable switch/router with multiple multicast rewrites, according to one embodiment of the present invention.

FIG. 7 shows an example of multiple multicast rewrites for time-based skewing in a NAT-capable switch or router, according to one embodiment of the present invention. As discussed with regard to FIG. 3, packets destined to multiple clients enter the NAT switch 700 by packet receive port 310 and are stored temporarily in packet buffer 320. The packet flow label is used to perform a lookup in flow directory 370 using lookup module 330. The index returned from this lookup is used by packet rewrite table 710 to provide two or more different virtual source addresses and destination group addresses, $(S_0,G_0)$, $(S_1,G_1)$, . . . .

For each rewritten packet header containing a new SA and DA [e.g., $(S_0,G_0)$, $(S_1,G_1)$, . . . ], packet header rewrite module 720a or 720b (configured as one rewrite module 720 per unique SA/DA pair) rewrites the packet header to include the new SA and DA and passes the packet (when scheduled by conventional methods) to corresponding packet transmit port 730a or 730b.

One of ordinary skill in the art will appreciate that while only two replications are shown in FIG. 7, many such replications and associated rewrites and transmissions are possible. Extra replication and transmission paths have only been omitted for clarity and do not imply a limitation.

Furthermore, although separate packet header rewrite modules 720 and packet transmit ports 730 are described, those skilled in the art will realize that a single rewrite module 720 and a single corresponding transmit port 730 can be used for all rewrites. This is possible if conventional scheduling allows time-based skewing of the transmitted packets.

As a further alternative, a set of rewrite modules 720 and packet transmit ports 730 comprising less than the number of replications can be used, if only a limited amount of time skewing is to be provided by the conventionally packet transmission scheduling system. Accordingly, the invention is not limited to any particular quantity of rewrite modules 720 and packet transmit ports 730.

Support of a transparent fail-over to a backup source is also an important capability and a significant use of a multi-source NAT capability. For example, an important Internet video broadcast might use redundant sources for reliability and efficient distribution. If the headend distribution router providing source (S',G') detects a failure in its primary video source, it can quickly switch to a warm standby (backup) video source, in this case (S",G"). (Refer to FIG. 5 and the corresponding discussion for an example of how such switching can be implemented.) Again, since all subscribers in the multicast host group are seeing data transmitted from the same virtual host (S,G) this "behind the scenes" switching from source (S',G') to backup source (S",G") is transparent to the users.

As a further alternate embodiment, a headend router can also provide different translations based on aspects of the packet data. Thus, for example, if some listening hosts are connected to the network by a low bandwidth link and the video source uses a multilevel video resolution encoding or a similar basis for selective drop (as known in the art), packets representing the low resolution component can be translated to one multicast channel. High-resolution component packets can be translated to a second multicast channel. Only those hosts subscribing to the high-resolution channel will receive the high resolution encoding, providing an alternate method of implementing differentiated services over IP.

While foregoing discusses a variety of different Network Address Translations and combinations of translations, one of ordinary skill in the art will readily appreciate that additional combinations of well-known protocol translations, mappings, and encodings are known in the art and commonly used in multicast. Accordingly, the present invention is not limited to any single type of packet translation or mapping or combination thereof, but rather includes all such variations of the underlying multicast packet data utilizing virtual host address translation.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, or comparable forms of computer instructions) stored in any computer-readable storage medium (e.g., ROM, RAM, magnetic media, compact disc (CD) in any form, DVD, or comparable storage media). Accordingly, the present invention is not limited to any particular computing platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A method comprising:
   forming a first translated multicast packet from a first multicast packet, wherein
      the first multicast packet comprises a first source network address,
      the first multicast packet comprises a first destination address,
      the first translated multicast packet is configured to be sent via a single-source multicast channel by virtue of the forming the first translated multicast packet, and
      the forming the first translated multicast packet comprises
         replacing the first source network address with a first virtual source network address, and
         replacing the first destination address with a first virtual destination address;
   forming a second translated multicast packet from a second multicast packet, wherein
      the second multicast packet comprises a second source network address,
      the second multicast packet comprises a second destination address,
      the second translated multicast packet is configured to be sent via the single-source multicast channel by virtue of the forming the second translated multicast packet, and
      the forming the second translated multicast packet comprises
         replacing the second source network address with a second virtual source network address, wherein the second virtual source network address is different from the first virtual source network address, and
         replacing the second destination address with the first virtual destination address;
   forming another translated multicast packet from another multicast packet, wherein
      the another multicast packet comprises another source network address, and
      the another translated multicast packet is configured to be sent via the single-source multicast channel by virtue of the forming the another translated multicast packet comprising
         replacing the another source network address with the first virtual source network address;
   sending the first translated multicast packet via the single-source multicast channel; and
   sending the another translated multicast packet via the single-source multicast channel.

2. The method of claim 1, wherein
   the first multicast packet is received from a first packet source, and
   the second multicast packet is received from a second packet source.

3. The method of claim 2, further comprising
   detecting a failure of the first packet source, wherein
      the replacing the second source network address with the second virtual source network address is performed in response to the detecting the failure of the first packet source.

4. The method of claim 1, further comprising:
   sending the second translated multicast packet via the single-source multicast channel.

5. The method of claim 1, further comprising:
   sending the another translated multicast packet via a second single-source multicast channel.

6. The method of claim 5, further comprising:
   performing time-based skewing for the another translated multicast packet relative to the first translated multicast packet.

7. A method comprising:
   forming a first translated multicast packet from a first multicast packet, wherein
      the first multicast packet comprises a first source network address, and
      the first multicast packet is received from a first packet source,
      the first packet source generates packets corresponding to a first view of an event, and
      the first translated multicast packet is configured to be sent via a single-source multicast channel by virtue of the forming the first translated multicast packet comprising
         replacing the first source network address with a first virtual source network address;
   forming a second translated multicast packet from a second multicast packet, wherein
      the second multicast packet comprises a second source network address, the second multicast packet is received from a second
packet source,
the second packet source generates packets corresponding to a second view of the event, and
the second translated multicast packet is configured to
be sent via the single-source multicast channel by
virtue of the forming the second translated multicast
packet comprising
replacing the second source network address with a
second virtual source network address, wherein the
second virtual source network address is different
from the first virtual source network address;
forming another translated multicast packet from another
multicast packet, wherein
the another multicast packet comprises another source
network address, and
the another translated multicast packet is configured to
be sent via the single-source multicast channel by
virtue of the forming the another translated multicast
packet comprising
replacing the another source network address with the
first virtual source network address;
sending the first translated multicast packet via the single-source multicast channel; and
sending the another translated multicast packet via the single-source multicast channel.

8. A method comprising:
forming a first translated multicast packet from a first multicast packet, wherein
the first multicast packet comprises a first source network address,
the first translated multicast packet is associated with a first time slot identifier,
the first time slot identifier identifies a first time slot,
the first translated multicast packet is configured to be sent via a single-source multicast channel by virtue of the forming the first translated multicast packet comprising
replacing the first source network address with a first virtual source network address, and
the first translated multicast packet is conveyed via the single-source multicast channel in the first time slot; and
forming a second translated multicast packet from a second multicast packet, wherein
the second multicast packet comprises a second source network address,
the second translated multicast packet is associated with a second time slot identifier,
the second time slot identifier identifies a second time slot,
the second translated multicast packet is configured to be sent via the single-source multicast channel by virtue of the forming the second translated multicast packet comprising
replacing the second source network address with a second virtual source network address, wherein the second virtual source network address is different from the first virtual source network address, and
the second translated multicast packet is conveyed via the single-source multicast channel in the second time slot;
forming another translated multicast packet from another multicast packet, wherein
the another multicast packet comprises another source network address, and
the another translated multicast packet is configured to be sent via the single-source multicast channel by virtue of the forming the another translated multicast packet comprising
replacing the another source network address with the first virtual source network address;
sending the first translated multicast packet via the single-source multicast channel;
sending the second translated multicast packet via the single-source multicast channel; and
sending the another translated multicast packet via the single-source multicast channel.

9. A network device comprising:
a packet rewrite table; and
a packet header rewrite engine coupled to the packet rewrite table, wherein
the packet rewrite table is configured to provide a first virtual source network address to the packet header rewrite engine, and
the packet header rewrite engine comprises a processor configured to
generate a first translated multicast packet from a first multicast packet, wherein
the first multicast packet comprises a first source network address,
the first multicast packet comprises a first destination address, and
the first translated multicast packet is configured to be sent via a single-source multicast channel by virtue of the packet header rewrite engine being configured to
replace the first source network address with the first virtual source network address, and
replace the first destination address with a first virtual destination address;
generate a second translated multicast packet from a second multicast packet, wherein
the second multicast packet comprises a second source network address,
the second multicast packet comprises a second destination address, and
the second translated multicast packet is configured to be sent via the single-source multicast channel by virtue of the packet header rewrite engine being configured to
replace the second source network address with a second virtual source network address, wherein the second virtual source network address is different from the first virtual source network address, and
replace the second destination address with the first virtual destination address,
generate another translated multicast packet from another multicast packet, wherein
the another multicast packet comprises another source network address, and
the another translated multicast packet is configured to be sent via the single-source multicast channel by virtue of the packet header rewrite engine being configured to
replace the another source network address with the first virtual source network address,
send the first translated multicast packet via the single-source multicast channel, and
send the another translated multicast packet via the single-source multicast channel.

10. The network device of claim 9, wherein
the first multicast packet is received from a first packet source, and
the second multicast packet is received from a second packet source.

11. The network device of claim 10, wherein
the first packet source generates packets corresponding to a first view of an event, and
the second packet source generates packets corresponding to a second view of the event.

12. The network device of claim 9, wherein
the first translated multicast packet is associated with a first time slot identifier,
the first time slot identifier identifies a first time slot,
the second translated multicast packet is associated with a second time slot identifier,
the second time slot identifier identifies a second time slot,
the first translated multicast packet is conveyed via the single-source multicast channel in the first time slot, and
the second translated multicast packet is conveyed via the single-source multicast channel in the second time slot.

13. The network device of claim 9, wherein
transmission of the another translated multicast packet is time-skewed relative to transmission of the first translated multicast packet.

14. A network device comprising:
a packet rewrite table; and
a packet header rewrite engine coupled to the packet rewrite table, wherein
the packet rewrite table is configured to provide a first virtual source network address to the packet header rewrite engine, and
the packet header rewrite engine comprises a processor configured to
generate a first translated multicast packet from a first multicast packet, wherein
the first multicast packet is received from a first packet source,
the first multicast packet comprises a first source network address, and
the first translated multicast packet is configured to be sent via a single-source multicast channel by virtue of the packet header rewrite engine being configured to
replace the first source network address with the first virtual source network address,
prior to detection of a failure of the first source, translate multicast packets comprising the first source network address by replacing the first source network address with the first virtual source network address,
generate a second translated multicast packet from a second multicast packet, wherein
the second multicast packet is received from a second packet source,
the second multicast packet comprises a second source network address, and
the second translated multicast packet is configured to be sent via the single-source multicast channel by virtue of the packet header rewrite engine being configured to
replace the second source network address with a second virtual source network address, wherein the second virtual source network address is different from the first virtual source network address,
subsequent to the detection of the failure of the first source, translate multicast packets comprising the second source network address by replacing the second source network address with the second virtual source network address
generate another translated multicast packet from another multicast packet, wherein
the another multicast packet comprises another source network address, and
the another translated multicast packet is configured to be sent via the single-source multicast channel by virtue of the packet header rewrite engine being configured to
replace the another source network address with the first virtual source network address,
send the first translated multicast packet via the single-source multicast channel, and
send the another translated multicast packet via the single-source multicast channel.

15. A computer program product comprising
a plurality of instructions, comprising
a first set of instructions, executable by a processor, configured to form a first translated multicast packet from a first multicast packet, wherein
the first multicast packet comprises a first source network address,
the first multicast packet comprises a first destination address, and
the first set of instructions comprises
a first subset of instructions, executable by the processor, configured to configure the first translated multicast packet to be sent via a single-source multicast channel by virtue of said first subset of instructions comprising
a first sub-subset of instructions, executable by the processor, configured to replace a first source network address with a first virtual source network address, and to replace the first destination address with a first virtual destination address, and
a second set of instructions, executable by the processor, configured to form a second translated multicast packet replacing from a second multicast packet, wherein
the second multicast packet comprises a second source network address,
the second multicast packet comprises a second destination address, and
the second set of instructions comprises
a second subset of instructions, executable by the processor, configured to configure the second translated multicast packet to be sent via the single-source multicast channel by virtue of said second subset of instructions comprising
a second sub-subset of instructions, executable by the processor, configured to replace the second source network address with a second virtual source network address, and to replace the second destination address with the first virtual destination address, wherein the second virtual source network address is different from the first virtual source network address;
a third set of instructions, executable by the processor, configured to form another translated multicast packet replacing from another multicast packet, wherein the another multicast packet comprises another
source network address, and
the third set of instructions comprises
a third subset of instructions, executable by the
processor, configured to configure the another
translated multicast packet to be sent via the
single-source multicast channel by virtue of said
second subset of instructions comprising
a second sub-subset of instructions, executable
by the processor, configured to replace the
another source network address with the first
virtual source network address; and
a fourth set of instructions, executable by the processor,
configured to
send the first translated multicast packet via the single-
source multicast channel, and
send the another translated multicast packet via the
single-source multicast channel; and
a non-transitory computer-readable storage medium,
wherein the instructions are encoded in the non-transitory computer-readable storage medium.

16. The computer program product of claim 15, wherein
the first multicast packet is received from a first packet
source, and
the second multicast packet is received from a second
packet source.

17. The computer program product of claim 16, wherein
the first packet source generates packets corresponding to a
first view of an event, and
the second packet source generates packets corresponding
to a second view of the event.

18. The computer program product of claim 16, wherein
the instructions further comprise:
a fifth set of instructions, executable by the processor,
configured to detect a failure of the first packet source,
wherein
the second set of instructions are executed in response to
detecting the failure of the first packet source.

19. The computer program product of claim 15, wherein
the instructions further comprise:
send the second translated multicast packet via the single-
source multicast channel.

20. The computer program product of claim 19, wherein:
the first translated multicast packet is associated with a first
time slot identifier,
the first time slot identifier identifies a first time slot,
the second translated multicast packet is associated with a
second time slot identifier,
the second time slot identifier identifies a second time slot,
the first translated multicast packet is conveyed via the
single-source multicast channel in the first time slot, and
the second translated multicast packet is conveyed via the
single-source multicast channel in the second time slot.

21. The computer program product of claim 15, wherein
the instructions further comprise:
a fifth set of instructions, executable by the processor,
configured to send the another translated multicast
packet via a second single-source multicast channel.

22. The computer program product of claim 21, wherein
the instructions further comprise:
a sixth set of instructions, executable by the processor,
configured to perform time-based skewing for the
another translated multicast packet relative to the first
translated multicast packet.

23. A system comprising:
means for forming a first translated multicast packet from
a first multicast packet, wherein
the first multicast packet comprises a first source network address,
the first multicast packet comprises a first destination
address, and
the first translated multicast packet is configured to be
sent via a single-source multicast channel by virtue of
the means for forming the first translated multicast
packet comprising
a processor configured for replacing a first source
network address with a first virtual source network
address, and
means for replacing the first destination address with
a first virtual destination address;
means for forming a second translated multicast packet
from a second multicast packet, wherein
the second multicast packet comprises a second source
network address,
the second multicast packet comprises a second destination address, and
the second translated multicast packet is configured to
be sent via the single-source multicast channel by
virtue of the means for forming the second translated
multicast packet comprising
means for replacing the second source network
address with a second virtual source network
address, wherein the second virtual source network
address is different from the first virtual source
network address, and
means for replacing the second destination address
with the first virtual destination address;
means for forming another translated multicast packet
from another multicast packet, wherein
the another multicast packet comprises another source
network address, and
the another translated multicast packet is configured to
be sent via the single-source multicast channel by
virtue of the means for forming the another translated
multicast packet comprising
means for replacing the another source network
address with the first virtual source network
address;
means for sending the first translated multicast packet via
the single-source multicast channel; and
means for sending the another translated multicast packet
via the single-source multicast channel.

24. The system of claim 23, wherein
the first multicast packet is received from a first packet
source, and
the second multicast packet is received from a second
packet source.

25. The system of claim 24, wherein
the first packet source generates packets corresponding to a
first view of an event, and
the second packet source generates packets corresponding
to a second view of the event.

26. The system of claim 24, further comprising:
means for detecting a failure of the first packet source,
wherein
the second source network address is replaced with the
second virtual source network address in response to
the detecting the failure of the first packet source.

27. The system of claim 23, further comprising:
means for sending the second translated multicast packet
via the single-source multicast channel.

28. The system of claim 27, wherein:

the first translated multicast packet is associated with a first time slot identifier, the first time slot identifier identifies a first time slot, the second translated multicast packet is associated with a second time slot identifier, the second time slot identifier identifies a second time slot, the first translated multicast packet is conveyed via the single-source multicast channel in the first time slot, and the second translated multicast packet is conveyed via the single-source multicast channel in the second time slot.

29. The system of claim 23, further comprising:

means for sending the another translated multicast packet via a second single-source multicast channel.

30. The system of claim 29, further comprising:

means for performing time-based skewing for the another translated multicast packet relative to the first translated multicast packet.

\* \* \* \* \*